May 27, 1952     O. W. ROTH     2,598,443
CUTTING TOOL
Filed April 7, 1947
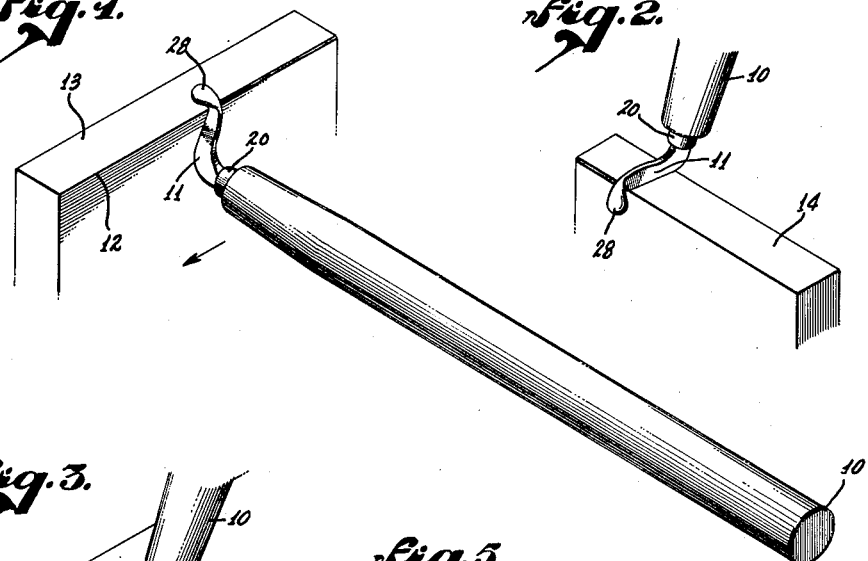
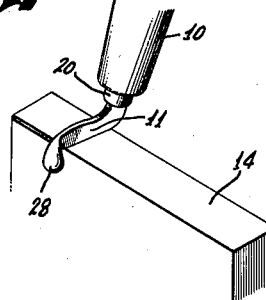
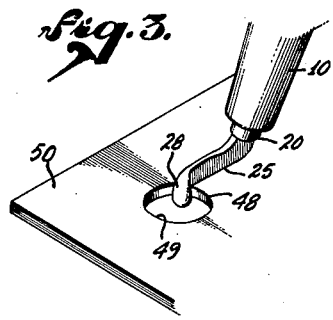
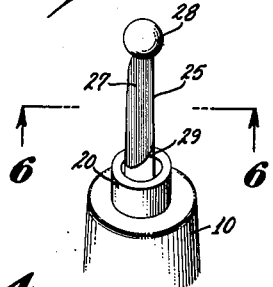
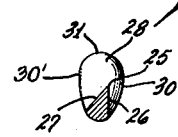
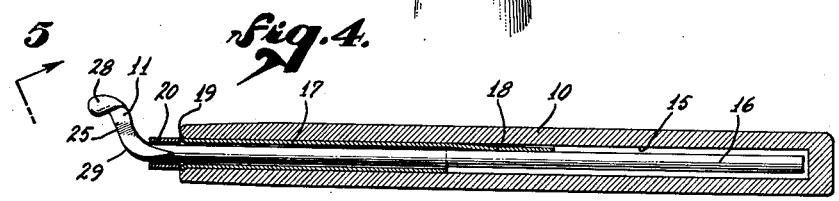
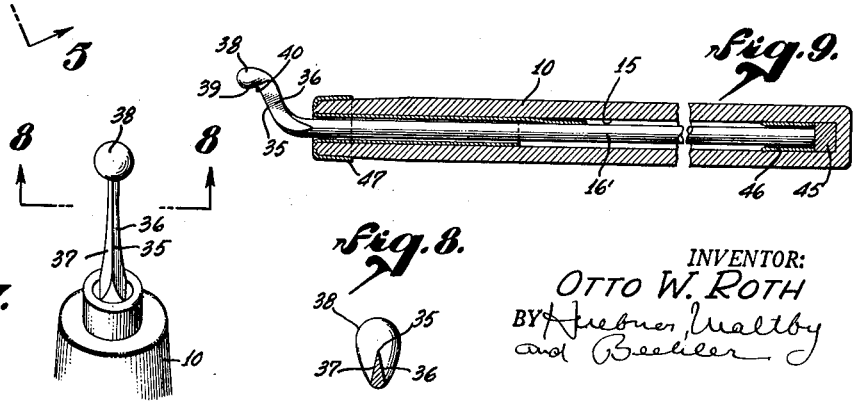
INVENTOR:
OTTO W. ROTH
BY Huebner, Maltby
and Beehler
ATTORNEYS.

Patented May 27, 1952

2,598,443

UNITED STATES PATENT OFFICE 2,598,443

CUTTING TOOL

Otto W. Roth, Los Angeles, Calif.

Application April 7, 1947, Serial No. 739,803

3 Claims. (Cl. 30—286)

The invention relates to hand tools having a sharp cutting or shearing edge which is adapted to cut the burrs from punched or sheared edges of metal and other material.

For as long as metal has been wroked by cutting, shearing, punching, machining, sawing, grinding and some other similar types of operations there has always been the problem of reconditioning the edge of the metal where the operation has taken place. Working of the metal invariably raises what are commonly termed burrs or ragged edges where the operation has taken place. The same condition applies in the working of such materials as plastics and pressed wood.

Before the punched or sheared metallic piece is subjected to additional operations, it becomes necessary to remove the burr and smooth off the roughened edge. Sometimes an ordinary knife blade or file is used. Hooked scrapers of different kinds for particular purposes have also been devised, but almost invariably the operation has depended upon a scraping operation which has seldom resulted in a tool capable of cutting off the burr smoothly and evenly. Such tools as have heretofore been devised have been successful only in the hands of skillful and capable workmen and then only to a limited extent.

It is, therefore, among the objects of my invention to provide a new and improved cutting tool so designed that even in the hands of inexperienced persons the tool may be used successfully to trim and work the edge of metal or other material where some handwork might be required in order to properly condition the edge.

Another object of the invention is to provide a new and improved cutting tool for handwork, the action of which more closely resembles a shaving action than a scraping action when the tool is used as a burr remover or as a device for shaping and smoothing the edge of hard material such as metals, plastics and the like.

Another object of the invention is to provide a new and improved shaper and burr cutter which is so designed that it is capable of making a smooth and even cut around corners of relatively small radii and also to provide such a cutting tool which is capable of smoothly working the edge of a punched hole of small diameter.

It is, moreover, among the objects of the invention to provide a new and improved metal working tool which is particularly easy and efficient in its operation requiring relatively little muscular effort, which has no sharp edges or points which might inadvertently cut the fingers or damage the clothing of a workman using the tool and carrying it about, which is so designed that the cutting edge can be varied to some extent in different tools in order to adapt them more specifically to different types of uses, and furthermore to provide a tool which is simple and inexpensive.

With these and other objects in view, the invention consists in the construction, arrangement and combination of the various parts of the device whereby the objects contemplated are attained, as hereinafter more fully set forth pointed out in the claims and illustrated in the accompanying drawings, in which:

Figure 1 is a perspective view of the tool showing the operation of removing a burr from the edge of a piece of material.

Figure 2 is a perspective view somewhat similar to Figure 1 illustrating use of the tool in shaving the surface of material.

Figure 3 is a perspective view illustrating use of the tool in removing a burr from a punched hole.

Figure 4 is a longitudinal sectional view of of the tool.

Figure 5 is a perspective view of the tool taken on the line 5—5 of Figure 4 and illustrating in particular the cutting edge.

Figure 6 is a cross-sectional view of the cutting portion of the tool taken on the line 6—6 of Figure 5.

Figure 7 is a perspective view somewhat similar to Figure 5 showing a cutting edge of different character.

Figure 8 is a cross-sectional view taken on the line 8—8 of Figure 7.

Figure 9 is a foreshortened longitudinal sectional view of a modified type of handle structure for the tool.

When a hand cutting tool is used to remove burrs and to work and shape the edge of material, such as metal and the harder plastics, it becomes desirable to provide the tool with a handle which can be readily grasped in order to permit the user to firmly direct the course of the tool and also to permit working with the tool in some cases over long periods of time without undue fatigue.

Tools of this general character are usually pocket tools or at least a tool so small that it can be readily carried about in a tool kit.

In an embodiment chosen to illustrate the invention there is shown a tool of this general description comprising a handle 10 carrying a cutting tool incorporating a blade portion 11. As illustrated in Figure 1, the tool is shown being used to remove the burr from an edge 12 of a piece of metal 13.

Details of the construction of the tool may best be seen from an examination of Figures 4, 5 and 6. As there shown, the handle 10 is provided with an elongated axial recess 15 which is adapted to receive a shaft 16 of the tool. In order to properly center and retain the shaft within the axial recess there is provided a sleeve or bushing 17 which extends well into the axial recess 15 and which is adapted to receive the shaft 16.

A spring pressed portion 18 on the sleeve is normally adapted to frictionally bear against the shaft so that it will not easily slip out of its position. The outer end of the sleeve is provided with a turned-over portion 19 bearing against the adjacent edge of the entrance of the axial recess so as to prevent the sleeve from being pushed into the handle beyond the position shown in Figure 4.

To facilitate the cutting operation there is provided upon the shaft a collar 20 which is adapted to bear against the turned-over portion 19 of the sleeve about which it may readily rotate.

The blade portion 11 joins the shaft 16 at an angle something less than 90°, as illustrated in Figure 4 and also in Figure 9. The angle will ordinarily be of approximately the magnitude shown, but may be made either more acute or more obtuse depending upon the type of work which will be most frequently encountered. Because of the desirability of having different types of blade portions for the fine work of different varieties, the shaft is made removable from the handle so that the same handle may be used with different tools. It will be observed, however, that the junction of the blade portion with the shaft may be curved so that there will remain sufficient strength at the junction.

The structure of the blade or cutting edge may best be discerned by an examination of Figures 5 and 6 for one type of blade and Figures 7 and 8 for another type of blade.

In Figures 5 and 6 the cutting portion consists of a knife edge 25 which is the edge at the junction of one flat side 26 and another flat side 27 which lies somewhat to the right of a plane parallel to the flat side 26 through the axis of the shaft and which is more readily apparent in Figure 6. The knife edge extends throughout a distance between a head or ball 28 at the tip of the plate and a point 29 adjacent that portion of the blade which is curved to meet the shaft. It will be noted that a portion of the head overhangs the cutting edge forming a lip.

The length of the knife edge may be longer or shorter depending upon the work which is expected of the tool; that is to say, if the tool is to be used only for cutting burrs, then the knife edge may be short. If, on the other hand, it is to be used for scraping a flat surface, it is better to have the knife edge longer.

For burring the edges of punched holes of small diameter and for cleaning around corners of relatively sharp radius a blade having the general shape and configuration of Figure 6 is found more acceptable.

Of considerable significance is the head 28. From an examination of Figure 6 it will be apparent that the head extends laterally relative to the cutting edge presenting sides 30 and 30'. It will further be apparent that there is a side 31 of the head sufficiently in advance of the cutting edge so that the head may be rested upon the material which is being cut or trimmed when the operation is started. These sides are somewhat rounded, but the edges of the sides are a sufficient distance beyond the cutting edge so that when the blade is applied to material to be cut in the usual way, one side or the other of the head will slide upon the adjacent surface of the material and aid in determining the angle or tilt of the cutting edge as the tool is drawn along.

While the precise shape and configuration of the head may be varied to some extent with regard to its roundness or length, it is nevertheless important to provide a substantial distance between the cutting edge and the side of the head which rides on the material so that the cutting edge will automatically assure a proper angle during the cutting operation.

In the type of blade illustrated in Figures 7 and 8, a cutting edge 35 is determined by flat faces 36 and 37 which are both tilted at an angle relative to a plane passing through the cutting edge 35 and through the axis of the shaft. The faces 36 and 37 where they join at the cutting edge form a relatively acute angle.

In the blade shown in both Figures 7 and 8 there is provided a ball or head 38 somewhat similar to the ball or head 28. In this blade, as well as in the blade previously described, the head 38 has a surface 39 adjacent the cutting edge which is located closer to the axis of the shaft than is a notch 40 at the junction of the cutting edge with the head.

When it is realized that the surface 39 is the surface which contacts the surface of the material which is being worked upon, it will be appreciated that when the tool is properly used the cutting edge will be at all times in contact with the material at some sharp portion or other between the ends of the cutting edge, the surface 39 serving to lift the cutting edge, in effect, to a proper cutting position.

Figure 9 shows an additional feature in that there is provided a step bearing 45 at the base of the axial recess 15 in the handle 10. A short gently flared bearing sleeve 46 is provided adjacent the thrust bearing so as to center the shaft 16' and thus provide a smoother operating swivel fit for the shaft. A cap 47 may also be provided near the outside end in order to strengthen that portion of the handle. When the structure of Figure 9 is used, the collar 20 may be dispensed with in that all of the thrust upon the shaft is taken up in the thrust bearing which obviates the need for the thrust collar 20.

In operation, best results are obtained by grasping the handle of the tool with all of the fingers and with the thumb of the operator directed toward the blade. With the tool in this position in the hand the cutting edge may be thrust endwise against the material which is to be cut while the head rests upon one surface of the material and guides the cutting edge into contact with either the edge 12, as illustrated in Figure 1, or a flat surface 14, as illustrated in Figure 2.

In either event, as the handle of the tool is drawn along in a direction at right angles to the axis of the handle, the head 28 riding upon the surface to which it is applied cooperates with the handle in establishing a tilt to the direction of the blade so that when the cutting edge is applied it will tilt to cut or shear the edge of the material rather than to be productive of a purely scraping action.

The same circumstance applies whether the tool is to be used for cutting off a burr, as in Figure 1, or for scraping the surface, as in Figure 2. The same general description also applies when the tool is used for removing the burr from an edge 48 of a punched hole 49 in a sheet or plate 50. Because of the fact that the cutting edge 25 is advanced slightly beyond a plane passing through the axis of the shaft, the cutting edge will more readily follow a sharply rounded curve such as the punched hole 49 makes.

For ordinary cutting along straight edges the tool of Figures 7 and 8 will be found more acceptable. Its acceptability is greatly enhanced by the fact that the tool of Figures 7 and 8 is reversible and will cut just as well when drawn in one direction as when drawn in a direction opposite thereto.

Although the tool of Figures 5 and 6 is better for working around curves of small radii, this tool is either right-handed or left-handed and can be satisfactorily used to cut on one side only, depending on which side of the center the cutting edge is located.

Manipulation of the tool is further aided by the fact that the operator when trimming small pieces may use the thumb of the hand which grasps the tool as a guide and to assist in manipulating and operating the tool. The blade is, moreover, permitted to freely swivel about its axis in the handle while the force applied directly in line with the cutting edge is absorbed either by the collar 20, in one instance, or the thrust bearing 45, in the other instance.

By providing a cutting tool having a short, sharp cutting edge working on a swivel and guided by a head which automatically determines the cutting relationship of the edge, a tool of precision accuracy may be supplied. The angle assumed as a result of the location and size of the head is determined more or less automatically to be one which renders the cutting edge capable of slicing or shearing metal.

The tilt thus established virtually eliminates any tendency of the cutting edge to remove a burr by nothing more than a scraping action. By keeping the number and relationship of the parts simple and rugged, such as those shown in the drawings, a tool is provided which will be one of great serviceability, long life and having an efficiency of operation not heretofore experienced.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent structures.

The invention having been herein described, what is claimed and sought to be secured by Letters Patent is:

1. A cutting tool comprising a shaft, a blade on the shaft having the longitudinal axis thereof disposed in a direction angularly outwardly and endwardly with respect to the axis of the shaft wherein one side of the blade forms an outside angle and another side forms an inside angle with respectively adjacent sides of the shaft, a cutting edge on the side of the blade forming the outside angle, and a smooth surfaced lip at the end of the blade disposed transversely with respect to the blade and on the side of the blade adjacent the cutting edge, said lip extending endwardly away from the shaft.

2. A cutting tool comprising a shaft, a blade on the shaft having the longitudinal axis thereof disposed in a direction angularly outwardly and endwardly with respect to the axis of the shaft wherein one side of the blade forms an outside angle of greater than 180° and less than 270° with the adjacent side of the shaft, a cutting edge on said one side of the blade, and a lip at the end of the blade disposed transversely with respect to the blade having a smooth portion adjacent the cutting edge and extending endwardly away from the shaft.

3. A cutting tool comprising an elongated shaft, a metal engaging element on the shaft having the longitudinal axis thereof disposed in a direction angularly outwardly and endwardly with respect to the axis of the shaft, one side of said metal engaging element forming an outside angle and the other side forming an inside angle with respectively adjacent sides of the shaft, and a smooth-surfaced head at the end of the metal engaging element disposed laterally with respect to the axis of the metal engaging element and endwardly away from the shaft, said metal engaging element having a metal removing portion at the side thereof forming the outside angle, said shaft having a handle surrounding the shaft and swively mounted thereon.

OTTO W. ROTH.

REFERENCES CITED

The following references are of record in the file of this patent:

UNITED STATES PATENTS

| Number | Name | Date |
| --- | --- | --- |
| 1,187,615 | Frees | June 20, 1916 |
| 1,537,529 | Enberg | May 12, 1925 |
| 1,775,813 | Colby | Sept. 16, 1930 |
| 1,842,903 | Falk | Jan. 16, 1932 |
| 2,359,607 | Bashara | Oct. 3, 1944 |